United States Patent Office

3,190,922
Patented June 22, 1965

3,190,922
LOW PRESSURE HYDROGENATION OF DISUBSTITUTED AMIDES OF CARBOXYLIC ACIDS TO TERTIARY AMINES
Ned M. Le Bard, Hopkins, and Leonard R. Vertnik, Minneapolis, Minn., and Ralph Fisher, Walnut Creek, and Kirtland E. McCaleb, Oakland, Calif., assignors to General Mills Inc., a corporation of Delaware
No Drawing. Filed Feb. 28, 1961, Ser. No. 92,144
10 Claims. (Cl. 260—583)

This invention relates to a process for the preparation of amines and more particularly to a process for the preparation of tertiary amines by low pressure hydrogenation of disubstituted amides prepared from carboxylic acids.

Because of the importance of tertiary amines in the fields of chemical intermediates, lubricants, petroleum additives, liquid ion exchange, and the like, considerable effort has been expended to discover economical routes to this class of materials. One of the methods for the preparation of amines which has been explored, but found to be commercially unattractive, involves the high pressure hydrogenation of amides in the presence of large amounts of a hydrophilic solvent. Such processes are described by Adkins and Wojcik in the Journal of the American Chemical Society, vol. 56, p. 247 (1934), and by Ueno and Takase in the Journal of the Society of Chemical Industry, Japan (kogyo Kwagaku Basshi) vol. 42, Supplemental Binding, page 409 (1939); vol. 44, Supplemental Binding, page 29 (1941). Typically, the reaction is carried out at a pressure of greater than 200 atmospheres with dioxane employed as a solvent. In addition to the obvious drawbacks of the high pressure and the solvent handling and removal, a number of side reactions occur which limit the yield and seriously diminish product purity.

It is an object of this invention to provide an economical process for the preparation of tertiary amines. It is another object of this invention to provide a process for the low pressure hydrogenation of disubstituted amides to form tertiary amines. It is a further object of this invention to provide a process for the preparation of tertiary amines in good yields. Other subject will appear hereinafter.

It has now been discovered that hydrogenation of amides to tertiary amines over a hydrogenation catalyst can be greatly promoted by removing a portion of the gaseous component from the reaction mixture and replacing the removed gases with hydrogen. It is preferred to continuously remove and replace the gases.

The hydrogenation of an amide may be illustrated by the following equation:

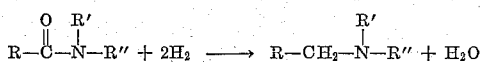

where R, R', R" are substituted or unsubstituted aliphatic, cycloaliphatic or aromatic radicals.

One of the distinct advantages of this invention is that the reaction can be carried out in the absence of solvent. Further, it is highly preferred not to employ a solvent in the reaction mixture since it is difficult to retain such a material within the mixture under the reaction conditions with continuous venting.

In contrast to prior art processes, the pressure of the reaction is not critical. It is however, desirable to maintain a pressure in the range of 150 to 1000 p.s.i.g. If desired, pressures higher than 1000 p.s.i.g. may be employed, but no particular advantage exists. Below about 150 p.s.i.g. the reaction rate decreases somewhat. Most preferably, the reaction pressure is maintained in the range of 200 to 800 p.s.i.g.

The reaction temperature should be maintained at about 200° C. to 350° C. and most preferably between 240° C. and 280° C. At lower temperatures the reaction rate decreases so as to make the reaction time impractically long, while at higher temperatures side reactions dominate.

The method of gaseous product removal and hydrogen addition is not critical, except that sufficient replacement of the gases should be made so that the water by-product is removed as it is formed. A build-up of water within the reaction vessel tends to slow the reaction. The optimum rate of gas flow will depend on the volatility of the reactants, reaction rate, temperature, reactor design, etc., and is therefore best determined by trial. Flow rates measured at reaction conditions of about 0.1 to 1.0 cubic feet per hour per pound of amide charged are preferred. Unreacted hydrogen and other starting materials can be recovered from the exit gas stream and returned to the reaction vessel, if desired.

The amides used as starting material in this process can be prepared by any of the methods known in the art. A preferred method of preparing simple N,N-disubstituted amides is by the condensation of an acid with a secondary amine. The preparation of a N,N,-dimethyl fatty amide from a higher fatty acid and dimethyl amine is illustrated by the following equation:

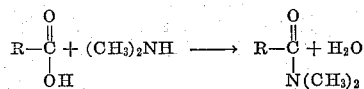

where R is an aliphatic hydrocarbon radical containing more than 8 carbon atoms. The copper-chromium oxide catalyst used in this invention tends to be deactivated by free acids. Thus, it is important that free acid in the amide be avoided to as great an extent as practical. Preferably, the acid number of the starting material should be reduced to 5 or less.

In the hydrogenation of amides having one or two low molecular weight substituents on the nitrogen atom, such as dimethyl fatty amide, it was found that relatively large amounts of fatty alcohols were formed as a by-product. Surprisingly, it was discovered that an excess of the secondary amine used to prepare the amide would ensentially avoid this undesirable side reaction. In the case of a dimethyl fatty amide, the continuous addition of dimethyl amine during the reaction at a rate of 0.5 to 6 lbs. per hour per mole of amide, has been found to be particularly effective.

Where the acid from which the amide is derived is of low molecular weight, such as, formic acid or acetic acid, there is a tendency for side reaction to occur. In this preparation, amounts of higher molecular weight secondary amines are formed, rather than desired amines. For example, when a difatty formamide is hydrogenated, appreciable amounts of difatty amine is formed, along with the desired monomethyl difatty amine. It has been discovered that the addition of amounts of the low molecular weight alcohol corresponding in carbon atoms to the acid from which the amide was derived, will successfully suppress this side reaction to an appreciable degree. Thus, in the case of a difatty formamide, amounts of methanol are fed continuously to the reactor along with the hydrogen.

The catalyst used in the process of the present invention is the well-known copper-chromium oxide hydrogenation catalyst, often referred to as "copper-chromite catalyst." The preparation of copper-chromium oxide catalysts is discussed in an article by Connor, Folkers and Adkins in the Journal of the American Chemical Society, vol. 54, pp. 1138-45 (1932), and in "Reactions of Hydrogen With Organic Compounds Over Copper-Chromium Oxide and Nickel Catalysts," by Homer Adkins, University of Wisconsin Press, Madison, Wisconsin (1937) The nature of this catalyst is further discussed in an article by Adkins, Burgoyne, and Schneider in the Journal of the American Chemical Society, vol. 72, pp. 2626–29 (1950). Commercially available copper-chromium oxide catalysts typically contain amounts of catalyst stabilizers, e.g., barium oxide. While these stabilizers apparently do not improve the catalyst from the standpoint of this reaction, catalysts containing such stabilizers can be employed if desired. Many types of copper-chromium oxide hydrogenation catalysts are commercially available and are generally useful in the instant invention. It is preferred to use a catalyst containing 40 to 65% CuO (assuming all copper is present as CuO) and 35 to 60% $Cr_2O_3$ (assuming all chromium to be present as $Cr_2O_3$).

The amount of catalyst employed is not critical. A greater amount of catalyst generally increases the rate of reaction, but the amount of catalyst does not, however, affect the nature of the final product. As pointed out, supra, free acid tends to deactivate the catalyst and, therefore, in the presence of acids, the amount of catalyst to effect a desired reaction rate will necessarily be increased. Catalyst in the amount of 1 to 10% by weight, based on the weight of amide, is sufficient for most purposes. If, however, large amounts of acid are present, catalyst of 10% by weight or greater, will be desirable to effect the reaction at reasonable rates. It is often desirable to reuse a portion of the catalyst on subsequent runs.

The process of the present invention is generally useful in hydrogenating any N,N-disubstituted amide group to the corresponding amine. The process is particularly useful in preparing amines having 10 to 72 carbon atoms from amides having the same number of carbon atoms, although even higher molecular weight materials can be prepared. Similarly, the process can be used to prepare lower molecular weight materials; however, these materials are generally more economically prepared by other routes. Thus, the process is most especially useful in preparing tertiary amines in which one or more of the radicals attached to the nitrogen atom is a higher aliphatic radical of 8–24 carbon atoms. The amides which are useful in preparing these tertiary amines are represented by the formula:

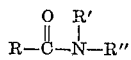

wherein R, R', and R'' are aliphatic hydrocarbon radicals of 1 to 24 carbon atoms and where at least one of R, R' or R'' has 8–24 carbon atoms. In addition R' and R'' can be part of a cyclic ring.

Another group of particularly useful starting materials are those disubstituted amides prepared from dibasic acids. These compounds, of course, contain two amide groups. Upon hydrogenation, both amide groups are convrted to amine groups. Adipic acid and dimerized linoleic acid are particularly useful in preparing suitable amide starting materials. Similarly, if a starting material is employed which contains three or more disubstituted amide groups, each amide group will be hydrogenated. The fact that the invention is general even to very high molecular weight amides containing many disubstituted amide groups, is illustrated by the fact that high molecular weight polyamides are readily hydrogenated to polyamines by the present invention.

Specific examples of compounds useful as starting materials include N,N-dimethyl stearamide; N,N-dimethyl palmitamide; N,N-dimethyl lauramide; N,N-dimethyl cocoamide; N,N-dimethyl oleamide; N,N,N',N'-tetramethyl adipamide; N,N,N',N'-tetra-n-octyl adipamide; N,N-distearyl stearamide; N,N-dibutyl palmitamide; N,N-dicyclohexyl stearamide; N,N-di-2-ethylhexyl myristamide; N,N-di-n-decyl lauramide; N,N-di-n-dodecyl isodecanamide; N,N-di-n-dodecyl isooctanamide; N,N,N',N'-tetramethyl amide of dimerized linoleic acid, N,N,N',N'-tetra (2-ethylhexyl) amide of dimerized linoleic acid; N,N'-di-tetradecoyl piperazine; and the high molecular weight polyamide prepared from dimerized linoleic acid and piperazine.

As used herein the term "fatty" means aliphatic hydrocarbon radical having 8–24 carbon atoms.

In order to more fully illustrate various preferred embodiments of the present invention and the advantageous results obtained thereby, the following examples are included. Unless otherwise indicated all parts and percentages used herein are by weight.

*Example I*

Into a 50 gallon stirred hydrogenation reactor were charged 300 pounds of N,N-dimethyl tallow amide having an acid number of 2.6 and 15 pounds of a copper-chromium oxide catalyst "G–13". The reactor was evacuated and pressurized with hydrogen to 400 p.s.i.g. Hydrogen was circulated at the rate of 4250 standard cubic feet per hour while maintaining the reaction pressure at 400 p.s.i.g. The reactor was then heated. When the temperature reached 150° C., dimethyl amine was added to the reactor at the rate of 3.6 pounds per hour. Water and dimethyl amine were recovered from the hydrogen recirculation stream and ejected as waste. The reactor and contents were maintained at a temperature of 260° C. during the reaction period. As the reaction progressed, samples were drawn from the reactor and analyzed for total amine number. After 5 hours the total amine number was 175–180 and the reaction was discontinued. The contents of the reactor were cooled to 100° C., the hydrogen vented and the product filtered. Analysis of the clear, colorless product indicated that 81.5% by weight was mono-(hydrogenated tallow) dimethyl amine and 18.5% by weight was di-(hydrogenated tallow) methyl amine. The total amine number was 177.0 and the tertiary amine number was 174.2. The color was 1–2 on the Gardner color scale. The mono-tallow dimethyl amine was separated by distillation at 205° C. and 2–4 mm. Hg to give 98% pure mono-tallow dimethyl amine.

*Example II*

Example I was repeated except the reaction was run at 600 p.s.i.g. with a feed or 6.2 pounds per hour of dimethylamine. After 3.85 hours the total amine number reached 180 and the reaction was discontinued. There were recovered 88.0% by weight of mono-(hydrogenated tallow) dimethyl amine and 12% by weight of di-(hydrogenated tallow) methyl amine. The product had a color of less than 1 on the Gardner color scale.

*Example III*

Example I was repeated except the reaction was carried out at 200 p.s.i.g. with a feed of 1.2 pounds per hour of dimethyl amine. After 9.0 hours the total amine number had reached about 170 and reaction was disconued. There were recovered 81.2% by weight of mono-(hydrogenated tallow) dimethyl amine and 14.7% by weight of di-(dihydrogenated tallow) methyl amine. The product had a color of less than 1 on the Gardner scale.

*Example IV*

Into a 50 gallon reactor were charged 300 pounds of N,N-dimethyl lauramide having an acid number of 1.2 and 15 pounds of the copper-chromium oxide catalyst of Example I. The reactor was evacuated and pressured with hydrogen at 400 p.s.i.g. While circulating hydrogen at 4250 standard cubic feet per hour, the reactor was heated and dimethyl amine fed to the reaction mixture at the rate of 1.0 pound per hour. Water and dimethyl amine were recovered from the hydrogen recirculation stream and ejected as waste. The temperature was maintained at 260° C. for 5.8 hours, at which time the reactor was cooled and the product filtered. The product contained 82.5% lauryl dimethyl amine and 17.0% dilauryl methyl amine.

Example V

This example illustrates the importance of the dialkylamine in the process.

Example I was repeated except no dimethyl amine was fed to the reactor. After a period of 4.15 hours the acid number had reached 163 and ceased to increase. The reaction was therefore discontinued. There were recovered 80.1% mono-(hydrogenated tallow) dimethyl amine, 8.9% di-(hydrogenated tallow) methyl amine, 8.7% fatty alcohol and 2.3% hydrocarbon. This is in contrast to the essentially 100% yield of tertiary amines obtained in the previous examples.

Example VI

Example I was repeated except a N,N-dimethyl coco amide prepared from coconut oil fatty acids and dimethyl amine was substituted for the N,N-dimethyl tallow amide of Example I. There was recovered a clear, colorless product having a total amine number of 223.2, a tertiary amine number of 223.0 and containing 77.5% mono-coco dimethyl amine and 22.5% di-coco dimethyl amine.

Example VII

Into a 50 gallon stirred reactor were charged 300 pounds of N,N-di-tallow tallow amide having an acid number of 2.0 and 15 pounds of the copper-chromium oxide catalyst of Example I. The reactor was evacuated and pressured with hydrogen to 400 p.s.i.g. While circulating hydrogen at 4250 standard cubic feet per hour, the reactor was heated to 260° C. and maintained there for 7 hours. During the reaction water was removed from the hydrogen recirculation stream and ejected as waste. After filtering the product there was obtained a clear, colorless product having a total amine number of 74.0, a tertiary amine number of 70.7 and a Gardner color of less than 1. Analysis of the product showed that it contained 95.3% tris-(hydrogenated tallow) amine.

Example VIII

Using essentially the procedure of Example I, the hydrogenation of N,N-dimethyl tallow amide was attempted in the absence of hydrogen circulation. During the course of the reaction sufficient hydrogen was added to maintain the pressure, but no gaseous products were removed. After 4 hours the uptake of hydrogen had completely ceased and the reaction mixture was cooled. Analysis indicated that about 70% of the original amide charge was unreacted. The product had a total amine number of 14.6 and a tertiary amine number of 11.3.

Example IX

Into a 1000 ml. reactor were charged 530 grams of N,N-didecyl lauramide having an acid number of 3.6 and 53 grams of the copper-chromium oxide catalyst of Example I. The reactor was pressurized with hydrogen to 400 p.s.i.g. The reactor was heated to 260° C. and maintained at this temperature while gases were continuously vented from the system. The pressure was maintained with hydrogen at 400 p.s.i.g. After 5.75 hours the reactor was cooled to 100° C., the hydrogen vented and the product filtered. Analysis of the clear light-colored product indicated that it was 94.2% didecyl-dodecyl amine.

Example X

Into a 1000 ml. reactor were charged 530 grams of N,N-didodecyl isodecanamide having an acid number of 3.3 and 53 grams of copper-chromium oxide catalyst. The procedure was used as in Example IX above except that the reaction was run for 11.25 hours. Analysis of the clear light-colored product indicated that it was 93.8% didodecyl isodecyl amine.

Example XI

Into the same reactor used in Example IX were charged 600 grams of N,N'-di-(2-ethylhexyl)tetradecanamide having an acid number of 1.7 and 60 grams of copper-chromium oxide catalyst. The reaction was run like Example IX except that the temperature was maintained at 270° C. for 17 hours. Analysis of the clear light-colored product indicated that it was 95.4% di-(2-ethylhexyl) tetradecyl amine.

Example XII

Into the same reactor used in Example IX were charged 600 grams of N,N,N',N'-tetra-(2-ethylhexyl) diamide prepared from dimerized linoleic acid and di-(2-ethylhexyl) amine. The acid value of the diamide was 8.8. Thirty grams of copper-chromium oxide catalyst was added and the reaction was run exactly as in Example IX except that the time of reaction was 54 hours. Analysis of the clear light-colored product indicated that it was 93.0% of N,N,N',N'-tetra-(2-ethylhexyl) dimer diamine.

Example XIII

Into the same reactor used in Example IX were charged 600 grams of N,N'-ditetradecoyl piperazine having an acid number of 1.9 and 60 grams of copper-chromium oxide catalyst. The reaction was run exactly as in Example IX except that the reaction was run for 21 hours. Analysis of the clear light-colored product indicated that it was 98.8% N,N'-ditetradecyl piperazine.

Example XIV

Into the same reactor used in Example IX were charged 307 grams of dimer acid piperazine polyamide prepared from dimerized linoleic acid and piperazine. The acid value of the polyamide was 3.8 and the viscosity at 160° C. was 5.5 poises. Thirty grams of copper-chromium oxide catalyst was added and the reaction was run exactly as in Example IX except that the time of reaction was 30.25 hours. Analysis of the semi-solid product indicated that it was 89% of dimer acid piperazine polyamine.

Example XV

Into a 1000 ml. stirred reactor were charged 600 grams of N-dodecyl succinimide and 30 grams of copper-chromium oxide catalyst. The reaction was carried out as in Example IX except the reaction conditions were maintained for 27 hours. Analysis of the product by amine numbers and infrared spectroscopy indicated the product was 84.2% dodecyl pyrrolidine.

Example XVI

Into a 1000 ml. stirred reactor were charged 600 grams of N,N-di-tallow formamide and 60 grams of copper-chromium oxide catalyst. The reaction was carried out as in Example IX except the reactor was maintained at 225 p.s.i.g. hydrogen pressure for a period of 5 hours. Analysis of the product indicated that there were obtained 65–70% di-(hydrogenated tallow) methyl amine and approximately 30% of di-(hydrogenated tallow) amine.

The foregoing examples are intended merely as illustrations of various embodiments of the invention and are not to be construed as limitations thereof.

As illustrated by the examples, the invention is highly useful for the preparation of tertiary amines from amides in high yields and excellent purity.

The embodiments of the present invention in which an exclusive property or privilege is claimed, are defined as follows:

1. In the process of hydrogenating amides prepared from carboxylic acids to form tertiary amines wherein a reaction mixture comprising hydrogen and a N,N-di-substituted amide is contacted with a hydrogenation catalyst at a temperature of about 200° C. to 350° C. and hydrogenating pressures, the improvement comprising removing a portion of the gaseous component of the reaction mixture and adding hydrogen to the reaction mixture.

2. The process of claim 1 wherein the hydrogenation catalyst is a copper-chromium oxide hydrogenation catalyst.

3. The process of claim 2 wherein a portion of the gaseous component of the reaction mixture is continuously removed and hydrogen continuously added to the reaction mixture.

4. The process of claim 2 wherein the N,N-disubstituted amide is a N,N-dialiphatic hydrocarbon aliphatic hydrocarbon amide and an aliphatic hydrocarbon secondary amine corresponding to the amine from which the amide is derived is continuously added to the reaction mixture.

5. The process of claim 2 wherein the N,N-disubstituted amide is a N,N-dialkyl alkyl amide wherein at least one of the alkyl groups contains 8 to 22 carbon atoms.

6. The process of claim 2 wherein the N,N-disubstituted amide is a N,N-dialiphatic hydrocarbon aliphatic hydrocarbon amide and an aliphatic primary alcohol having an aliphatic hydrocarbon group corresponding to the aliphatic hydrocarbon group of the acid from which the amide is derived is continuously added to the reaction mixture.

7. The process of preparing a tertiary amine which comprises contacting at a temperature in the range of 240° C. to 280° C. and a pressure in the range of 200 p.s.i.g. to 800 p.s.i.g., a reaction mixture comprising hydrogen, dimethyl amine and a N,N-dimethyl fatty amide with a copper-chromium oxide hydrogenation catalyst while continuously removing a portion of the gaseous component of said reaction mixture and continuously adding hydrogen and dimethyl amine to said reaction mixture.

8. The process of preparing a tertiary amine which comprises contacting at a temperature in the range of 240° C. to 280° C. and a pressure in the range of 200 to 800 p.s.i.g., a reaction mixture comprising hydrogen and a difatty fatty amide with a copper-chromium oxide hydrogenation catalyst while continuously removing a portion of the gaseous component of said reaction mixture and continuously adding hydrogen to said reaction mixture.

9. The process of preparing a tertiary amine which comprises contacting at a temperature in the range of 240° C. to 280° C. and a pressure in the range of 200 to 800 p.s.i.g., a reaction mixture comprising hydrogen and a diamide having no hydrogen atoms bonded to the amide nitrogen atoms, said diamide having been prepared from a dicarboxylic acid with a copper-chromium oxide hydrogenation catalyst while continuously removing a portion of the gaseous component of said reaction mixture and continuously adding hydrogen to said reaction mixture.

10. The process of preparing a tertiary amine which comprises contacting at a temperature in the range of 240° C. to 280° C. and a pressure in the range of 200 p.s.i.g. to 800 p.s.i.g., a reaction mixture comprising hydrogen, methanol and a N,N-difatty formamide with a copper-chromium oxide hydrogenation catalyst while continuously removing a portion of the gaseous component of said reaction mixture and continuously adding hydrogen and methanol to said reaction mixture.

References Cited by the Examiner

UNITED STATES PATENTS

| | | | |
|---|---|---|---|
| 1,762,742 | 6/30 | Reppe | 260—583 |
| 1,830,705 | 11/31 | Marx et al. | 260—583 |
| 1,966,478 | 7/34 | Baur | 260—583 |
| 1,971,743 | 8/34 | Bertsch | 260—583 |
| 2,045,574 | 6/36 | Adkins | 260—583 |
| 2,118,001 | 5/38 | Andrews et al. | 260—583 |
| 2,143,751 | 1/39 | Adkins | 260—583 |
| 2,160,058 | 5/39 | Covert | 260—583 |
| 2,166,971 | 7/39 | Schmidt et al. | 260—583 |
| 2,187,745 | 1/40 | Lazier | 260—583 |
| 2,292,879 | 8/42 | Kise | 260—580 |
| 2,422,632 | 6/47 | Olin et al. | 260—583 |
| 2,781,340 | 2/57 | Schlittler et al. | 260—583 |

CHARLES B. PARKER, *Primary Examiner.*

IRVING MARCUS, JOSEPH P. BRUST, *Examiners.*